United States Patent Office 2,839,407
Patented June 17, 1958

2,839,407

CREAM TABLET AND PROCESS FOR THE MANUFACTURE OF IT

Henry Secher Brochner, Copenhagen, Denmark, assignor to Ordex Laboratorium ved ingeniør C. O. Rasmussen, Copenhagen, Denmark, a Danish firm No Drawing. Application April 22, 1955
Serial No. 503,355

4 Claims. (Cl. 99—78)

It is well known to prepare powdered milk products, inclusive of products having a high content of fat such as cream powder.

Cream as an addition to coffee, tea and other kinds of beverage is usually taken in relatively small amounts, and it would, therefore, be advantageous if it was possible from the known powdered milk products, such as cream powder, to prepare tablets or similar small quantities of such well defined shape that they are easily stored. Truly, it is possible to tablet the hitherto known powdered milk products but up to now it has not thereby been possible to obtain any kind of tablet which may be used as an addition to for instance coffee and tea because when the powdered mass has been pressed into tablet shape the coherence of it is so great that it becomes practically insoluble even in warm tea or coffee. The object of the present invention is to provide a cream tablet which is readily dissolved and which contains the basic constituents of milk: butter fat, carbohydrates, and protein. This object is achieved by making the tablet contain definite proportions of the said basic constituents deviating from the proportions in which the constituents are present in powders prepared from natural milk products. Thus, a 40% cream prepared by ordinary centrifugalization contains about 40% fat, about 2.21% protein, and about 3.0% carbohydrates and minor amounts of inorganic constituents and water for the rest. If such a cream is dried to form a powder this powder will contain approximately double the above mentioned amounts of the three constituents, and a tablet made from this powder will be practically insoluble. The cream tablet of the present invention is, however, easily soluble seeing that it is characteristic by containing 30–60% butter fat, 6–12% protein and at least 20% carbohydrates.

In the preferred composition according to the invention the cream tablet contains 45% butter fat, 9% protein and 41% carbohydrates. The remaining 5% is water and inorganic constituents.

According to the invention the cream tablet can be manufactured by preparing powdered preparations consisting substantially of the butter fat and protein of milk and then mixing these preparations with carbohydrates in the proportions 30–60% butter fat, 6–12% protein and 20–60% carbohydrates, where after the dry mixture is processed into tablet shape.

In the process of the invention the milk may be separated into its three main constituents whereafter the two constituents fat and protein are mixed with carbohydrates in the said proportions different from the proportions in which the constituents are present in natural or concentrated milk products, the carbohydrates possibly also being extracted from the milk. In a preferred embodiment according to the invention the cream tablet is manufactured by first preparing a cream powder by drying of a cream holding at least 20% fat and then mixing this cream powder with milk protein and carbohydrates. In order to obtain a soluble tablet it is necessary that the cream used for the purpose has a fat content of at least 20%. The cream tablet according to the invention may be prepared so as to have any desired shape, i. e. also such shapes as are not normally referred to as tablets, e. g. pills. They may be prepared with a nice smooth surface and such a coherence in the dry state that they may be preserved unimpaired equally well as other known kinds of tablets. Preparation of the cream powder in tablet form of course provides the advantage that the dry cream is more easily stored and distributed, and it is also more easily dosed in the desired quantities.

What I claim and desired to secure by Letters Patent is:

1. A compressed cream tablet having a high degree of solubility in warm drinks containing the basic constituents of milk, butter fat, carbohydrates and protein in the proportions 30–60% butter fat, 6–12% protein and at least 20% carbohydrates.

2. A cream tablet as claimed in claim 1 containing the basic constituents of milk in the proportions 45% butter fat, 9% protein and 41% carbohydrates.

3. A process for the manufacture of a compressed cream tablet having a high degree of solubility in warm drinks containing the basic constituents of milk, consisting in preparing dry preparations of the butter fat and protein of milk, mixing them with carbohydrates in the proportions 30–60% butter fat, 6–12% protein and 20–60% carbohydrates, and then compressing the mixture into tablet shape.

4. A process as claimed in claim 3, consisting in preparing a cream powder by drying of a cream holding at least 20% fat, mixing the cream powder with milk protein and carbohydrates, and compressing the mixture into tablet shape.

References Cited in the file of this patent

UNITED STATES PATENTS

| | | |
|---|---|---|
| 1,188,755 | Gere | June 27, 1916 |
| 1,258,996 | Dick | Mar. 12, 1918 |
| 1,808,730 | Bornegg | June 2, 1931 |
| 1,937,527 | Otting | Dec. 5, 1933 |
| 2,206,113 | Nitardy | July 2, 1940 |

OTHER REFERENCES

Food Industries, September 1943, pages 72, 73, 74, "Compressing Spray Dried Milk To Save Shipping Space."